United States Patent [19]
Tomozawa et al.

[11] Patent Number: 6,081,182
[45] Date of Patent: Jun. 27, 2000

[54] TEMPERATURE SENSOR ELEMENT AND TEMPERATURE SENSOR INCLUDING THE SAME

[75] Inventors: Atsushi Tomozawa, Osaka; Eiji Fujii, Hirakata; Hideo Torii, Higashiosaka; Ryoichi Takayama, Suita, all of Japan

[73] Assignee: Matsushita Electric Industrial Co., Ltd., Osaka-fu, Japan

[21] Appl. No.: 08/970,496

[22] Filed: Nov. 14, 1997

[30] Foreign Application Priority Data

Nov. 22, 1996 [JP] Japan ................................ 8-312353

[51] Int. Cl.⁷ .................................................... H01L 7/02
[52] U.S. Cl. ................................................ 338/25; 338/28
[58] Field of Search .......................... 338/22 R, 225 D, 338/25, 28; 374/185, 208, 209

[56] References Cited

U.S. PATENT DOCUMENTS

| | | | |
|---|---|---|---|
| 2,720,573 | 10/1955 | Lundqvist | 338/22 R |
| 2,959,755 | 11/1960 | Gecsey et al. | 338/28 |
| 3,412,359 | 11/1968 | Schwyn et al. | 338/28 |
| 3,547,835 | 12/1970 | Short | 338/22 SD |
| 3,645,785 | 2/1972 | Hentzschel | 338/22 SD |
| 4,200,970 | 5/1980 | Schonberger | 338/22 R |
| 4,259,657 | 3/1981 | Ishikawa et al. | 338/22 R |
| 4,349,958 | 9/1982 | Hakansson et al. | |
| 4,535,316 | 8/1985 | Wertheimer et al. | |
| 5,049,543 | 9/1991 | Van Der Kolk et al. | 505/1 |
| 5,372,427 | 12/1994 | Padovani et al. | |
| 5,411,600 | 5/1995 | Rimai et al. | |
| 5,497,139 | 3/1996 | Takahashi et al. | 338/22 SD |
| 5,743,646 | 4/1998 | O'Connell et al. | 374/208 |

FOREIGN PATENT DOCUMENTS

| | | |
|---|---|---|
| 0 703 438 A1 | 3/1996 | European Pat. Off. . |
| 0 770 862 A1 | 5/1997 | European Pat. Off. . |
| 58-14045 | 3/1983 | Japan . |
| 60-15123 | 4/1985 | Japan . |
| 06061012A | 3/1994 | Japan . |
| 06283310 | 10/1994 | Japan . |
| 08271332 | 10/1996 | Japan . |
| WO96/35932 | 11/1996 | WIPO . |

OTHER PUBLICATIONS

European Search Report from European Counterpart Application No. EP 97309279 dated Feb. 17, 1998 (1 Page).

Primary Examiner—Karl Easthom
Attorney, Agent, or Firm—Akin, Gump, Strauss, Hauer & Feld, L.L.P.

[57] ABSTRACT

The present invention provides a temperature sensor element having excellent heat resistance, quick heat response, stable resistance, and high reliability with a less variation in resistance against time. The temperature sensor element includes a thermo-sensitive film mainly composed of a heat sensitive material having electrical resistance varies depending on the temperature; a pair of electrode films arranged to measure the electrical resistance in the direction of the thickness of the thermo-sensitive film, a base plate mainly composed of a heat-resistant insulating material for supporting the thermo-sensitive film and the electrode films, an anti-diffusion film interposed between the thermo-sensitive film and the electrode film in the vicinity of the base plate, and a film mainly composed of a heat-resistant insulating material for covering the thermo-sensitive film and the electrode films except the lead-connecting terminals of the electrode films. The thermo-sensitive film is composed of an oxide of corundum crystalline structure represented by the formula of $(Al_{1-x-y}Cr_xFe_y)_2O_3$, where $0.05 \leq x+y \leq 0.95$, and $0 \leq y/(x+y) \leq 0.6$, and the anti-diffusion film is composed of an oxide of corundum crystalline structure represented by the formula of $(Al_{1-x-y}Cr_xFe_y)_2O_3$, where $0 \leq x+y \leq 0.95$.

8 Claims, 10 Drawing Sheets

TEMPERATURE SENSOR ELEMENT AND TEMPERATURE SENSOR INCLUDING THE SAME

BACKGROUND OF THE INVENTION

The present invention relates to a temperature sensor element and a temperature sensor including the same. More specifically the present invention pertains to a temperature sensor with excellent heat resistance, heat response, and reliability.

With enhanced concern about the environment, it is required to treat the gaseous exhaust from an engine of an automobile before release to the atmosphere. A catalytic converter is accordingly arranged in the exhaust system for converting the gaseous exhaust to a harmless form. Accurate measurement of the catalyst temperature is essential for enhancing the efficiency of conversion, that is, the catalyst performance. A temperature sensor element used for that purpose should have excellent heat resistance, quick heat response, and high reliability with a less variation in resistance against time.

Figure 16:
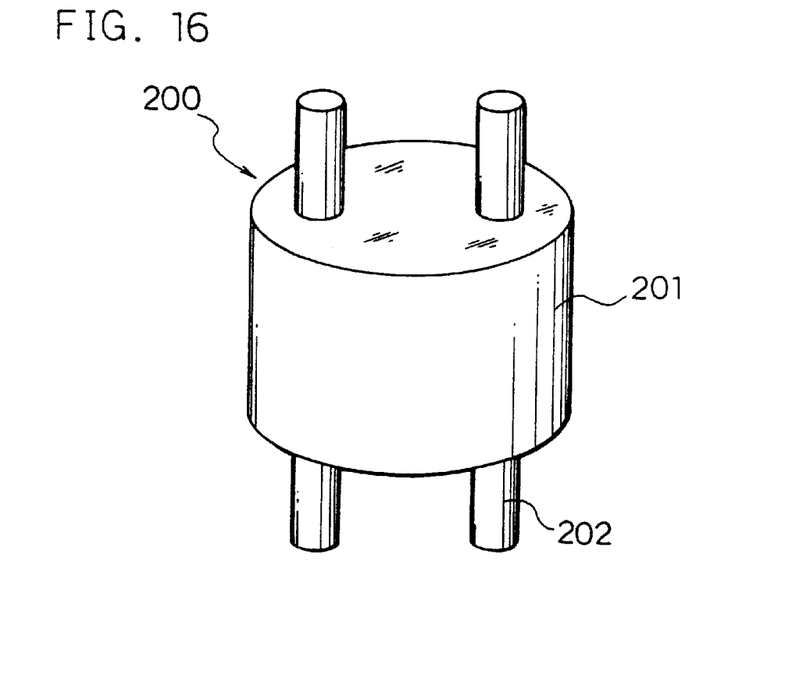
FIG. 16 is a perspective view illustrating a prior art temperature sensor element.

One of known temperature sensor elements has structure shown in FIG. 16. A temperature sensor element 200 includes a sintered heat sensitive body 201 of a linear type, non-linear type, negative temperature coefficient type, or positive temperature coefficient type and a pair of lead wires 202 of a noble metal, which are integrated with the heat sensitive body 201. The temperature sensor element 200 is manufactured by preliminarily firing a material mixture of a predetermined composition, grinding the fired mixture to powder, molding the power to a predetermined form, inserting the noble-metal lead wires 202 into the molded body, and firing the molded body at a high temperature of not lower than 1600° C.

Figure 17:
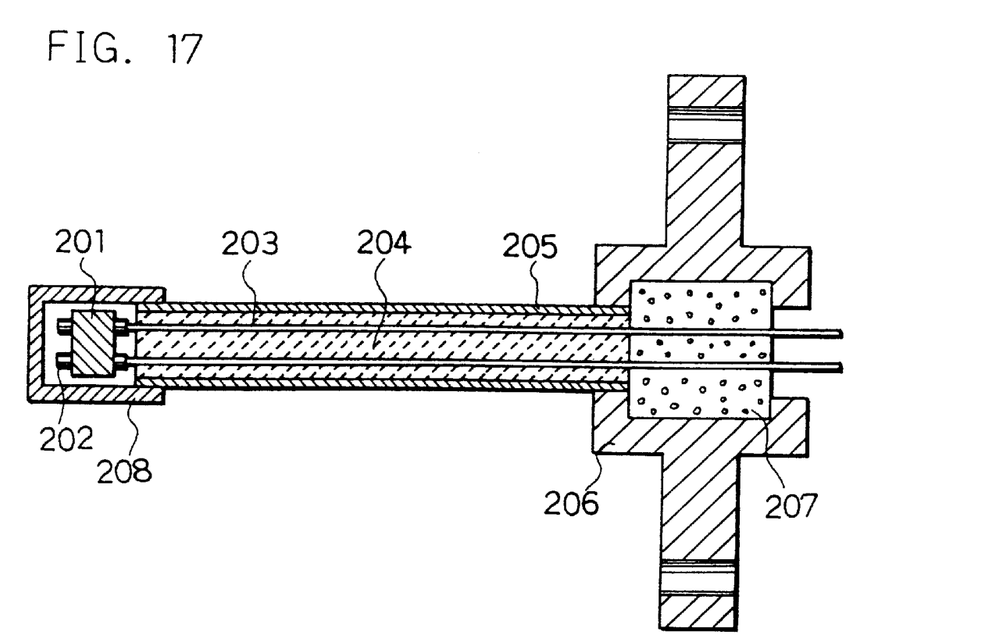
FIG. 17 is a vertical sectional view illustrating a temperature sensor including the prior art temperature sensor element.

FIG. 17 shows structure of a temperature sensor including the temperature sensor element 200 thus obtained. A pair of lead wires 203 connecting with the noble-metal lead wires 202 of the temperature sensor element 200 are fixed to an electrical insulator 204 in a metal housing 205. A heat-resistant metal cap 208 for covering the temperature sensor element 200 is welded to one end of the housing 205, whereas a metal flange 206 for fixing the temperature sensor to an object of temperature measurement is fixed to the other end of the housing 205. An electrical insulator 207 insulates the lead wires 203 from the housing 205 and the flange 206 (see, for example, Japanese Laid-Open Patent Hei 6-283310).

This prior art temperature sensor including the temperature sensor element has a problem of poor heat response when being applied to the catalytic converter of the automobile. The poor heat response is ascribed to the fact that the heat sensitive body 201, which is a sintered, powder-molded body, is rather bulky and has a high heat capacity and that the temperature sensor element 200 is covered with the heat-resistant cap 208. Removal of the heat-resistant metal cap 208 from the prior art temperature sensor causes another problem; that is, carbon in the gaseous exhaust deposits between the pair of lead wires 202 and causes a short circuit between the lead wires 202.

SUMMARY OF THE INVENTION

The object of the present invention is thus to provide a temperature sensor element having excellent heat resistance, quick heat response, stable resistance, and high reliability with a less variation in resistance against time, and a temperature sensor including such a temperature sensor element.

The temperature sensor element of the present invention includes a thin thermo-sensitive film mainly composed of a heat sensitive material having electrical resistance varies depending on the temperature and thin electrode films arranged to measure the electrical resistance of the thermo-sensitive film in the direction of the film thickness, in order to realize the quick heat response, stable resistance, and high reliability with a less variation in resistance against time The present invention is directed to a first temperature sensor element, which includes:

a thermo-sensitive film mainly composed of a heat sensitive material having electrical resistance varies depending on the temperature;

a pair of electrode films, each having a lead-connecting terminal, end portions of the electrode films being arranged to face each other across the thermo-sensitive film;

a base plate mainly composed of a heat-resistant insulating material for supporting the thermo-sensitive film and the pair of electrode films; and a film mainly composed of a heat-resistant insulating material for covering the thermo-sensitive film and the pair of electrode films except the lead-connecting terminals of the electrode films.

The present invention is also directed to a second temperature sensor element, which includes:

a thermo-sensitive film mainly composed of a heat sensitive material having electrical resistance varies depending on the temperature;

a pair of electrode films, each having a lead-connecting terminal, end portions of the electrode films being into contact with one face of the thermo-sensitive film;

a third electrode film arranged to face the end portions of the pair of electrode films on the other face of the thermo-sensitive film;

a base plate mainly composed of a heat-resistant insulating material for supporting the thermo-sensitive film, the pair of electrode films, and the third electrode film; and a film mainly composed of a heat-resistant insulating material for covering the thermo-sensitive film, the pair of electrode films, and the third electrode film except the lead-connecting terminals of the pair of electrode films.

In accordance with one preferable mode of the temperature sensor element of the present invention, an oxide of corundum crystalline structure represented by the formula where $0.05 \leq x+y \leq 0.95$, and $0 \leq y/(x+y) \leq 0.6$
is adopted for the heat sensitive material.

The present invention also provides a method of manufacturing a temperature sensor element, which includes the steps of: forming a film of an oxide represented by the above formula according to a thin film-forming technique and sintering the film for a change to the corundum crystalline structure.

The method forms an anti-diffusion film of an oxide represented by the formula where $0 \leq x+y \leq 0.95$
and heat-treats the oxide for a change to the corundum crystalline structure, before forming and heat-treating the thermo-sensitive film. This procedure effectively prevents the material of the electrode films from diffusing into the thermo-sensitive film and damaging the properties of the thermo-sensitive film, and gives a temperature sensor element having a less variation in resistance against time and high reliability.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

As described above, the temperature sensor element of the present invention basically includes a thermo-sensitive film, electrode films arranged for measuring the electrical resistance of the thermo-sensitive film in the direction of the thickness, an electrically-insulating base plate for supporting the thermo-sensitive film and the electrode films, and an electrically-insulating film for covering the thermo-sensitive film and the electrode films except lead-connecting terminals of the electrode films.

In accordance with one preferable mode of the present invention, the temperature sensor element has an anti-diffusion film between the thermo-sensitive film and the electrode film that is located on the side of the base plate.

One method of manufacturing a temperature sensor element according to the present invention includes the steps of: forming a first electrode film having a lead-connecting terminal on a base plate mainly composed of a heat-resistant insulating material; forming an anti-diffusion film of an oxide represented by the formula $$(Al_{1-x-y}Cr_xFe_y)_2O_3$$

where $0 \leq x+y \leq 0.95$
to cover an end portion of the first electrode film and heat-treating the anti-diffusion film at temperatures of 1000 to 1300° C.; forming a thermo-sensitive film of an oxide represented by the formula of $$(Al_{1-x-y}Cr_xFe_y)_2O_3$$

where $0.05 \leq x+y \leq 0.95$, and $0 \leq y/(x+y) \leq 0.6$
upon the anti-diffusion film and heat-treating the thermo-sensitive film at temperatures of 1000 to 1300° C.; forming a second electrode film having a lead-connecting terminal and an end portion that is arranged to face the end portion of the first electrode film via the thermo-sensitive film and the anti-diffusion film; and forming a film mainly composed of a heat-resistant insulating material for covering the thermo-sensitive film and the first and second electrode films except the lead-connecting terminals of the electrode films.

Another method of manufacturing a temperature sensor element according to the present invention includes the steps of: forming a pair of electrode films respectively having lead-connecting terminals on a base plate mainly composed of a heat-resistant insulating material; forming an anti-diffusion film of an oxide represented by the formula $$(Al_{1-x-y}Cr_xFe_y)_2O_3$$

where $0 \leq x+y \leq 0.95$
to cover end portions of the pair of electrode films and heat-treating the anti-diffusion film at temperatures of 1000 to 1300° C.; forming a thermo-sensitive film of an oxide represented by the formula $$(Al_{1-x-y}Cr_xFe_y)_2O_3$$

where $0.05 \leq x+y \leq 0.95$, and $0 \leq y/(x+y) \leq 0.6$
upon the anti-diffusion film and heat-treating the thermo-sensitive film at temperatures of 1000 to 1300° C.; forming a third electrode film arranged to face the end portions of the pair of electrode films via the anti-diffusion film and the thermo-sensitive film; and forming a film mainly composed of a heat-resistant insulating material for covering the thermo-sensitive film, the pair of electrode films, and the third electrode film except the lead-connecting terminals of the pair of electrode films.

Still another method of manufacturing a temperature sensor element according to the present invention includes the steps of: forming a third electrode film on a base plate mainly composed of a heat-resistant insulating material; forming an anti-diffusion film of an oxide represented by the formula $$(Al_{1-x-y}Cr_xFe_y)_2O_3$$

where $0 \leq x+y \leq 0.95$
upon the third electrode film and heat-treating the anti-diffusion film at temperatures of 1000 to 1300° C.; forming a thermo-sensitive film of an oxide represented by the formula $(Al_{1-x-y}Cr_xFe_y)_2O_3$ where $0.05 \leq x+y \leq 0.95$, and $0 \leq y/(x+y) \leq 0.6$ upon the anti-diffusion film and heat-treating the thermo-sensitive film at temperatures of 1000 to 1300° C.; forming a pair of electrode films respectively having lead-connecting terminals and end portions arranged to face the third electrode film via the thermo-sensitive film and the anti-diffusion film; and forming a film mainly composed of a heat-resistant insulating material for covering the thermo-sensitive film, the pair of electrode films, and the third electrode film except the lead-connecting terminals of the pair of electrode films.

The temperature sensor of the present invention includes the temperature sensor element of the above structure, a metal flange for fixing the temperature sensor to an object of temperature measurement, a metal housing fixed to the metal flange for covering a part of the temperature sensor element with the exposed lead-connecting terminals, lead wires connecting with the lead-connecting terminals of the electrode films, a cover for covering the residual part of the temperature sensor element out of the metal housing, and an electrical insulator arranged in the metal housing for insulating the lead-connecting terminals from the metal housing and the metal flange.

A favorable material of the thermo-sensitive film is an oxide of corundum crystalline structure prepared from a solid solution $Al_2O_3$ with Cr or Cr and Fe incorporated therein and represented by the formula of $(Al_{1-x-y}Cr_xFe_y)_2O_3$. The oxide satisfying the conditions of $0.05 \leq x+y \leq 0.95$ and $0 \leq y/(x+y) \leq 0.6$ realizes the heat response and durability as discussed later in Examples.

A favorable material of the anti-diffusion film is an oxide of corundum crystalline structure prepared from $Al_2O_3$ alone or a solid solution $Al_2O_3$ with Cr, Fe, or both Cr and Fe incorporated therein and represented by the formula $(Al_{1-x-y}Cr_xFe_y)_2O_3$ where $0 \leq x+y \leq 0.95$.

The material of the electrode film diffuses into the thermo-sensitive film in the process of forming the thermo-sensitive film on the electrode film and heat-treating the thermo-sensitive film at temperatures of 1000 to 1300° C. for a change to the corundum crystalline structure. The anti-diffusion film prevents the material of the electrode film from diffusing into the thermo-sensitive film and enables the thermo-sensitive film to maintain predetermined properties. Once the anti-diffusion film is heat-treated at temperatures of 1000 to 1300° C. for a change to the corundum crystalline structure, the anti-diffusion film effectively prevents the material of the electrode film from diffusing into the thermo-sensitive film formed on the anti-diffusion film. If the thermo-sensitive film is heat-treated in the above-mentioned manner, conversion of the structure into the corundum crystalline structure will occur and the film can have a uniform texture with no grain boundaries. As a result, even when an electrode film is formed directly on the thermo-sensitive film, there is less risk of diffusion of the material of the electrode film into the thermo-sensitive film.

It is preferable that the anti-diffusion film has substantially the same composition as that of the thermo-sensitive film. Such composition prevents Cr and Fe from being mutually diffused between the thermo-sensitive film and the anti-diffusion film in the course of heat treatment of the thermo-sensitive film. The anti-diffusion film may alternatively be composed of an insulating material, such as $Al_2O_3$. During the course of heat treatment of the anti-diffusion film, the material of the electrode film located below the anti-diffusion film diffuses into the anti-diffusion film to give electrical conductivity. The electrical resistance between the electrode films across the thermo-sensitive film and the anti-diffusion film is virtually equivalent to the electrical resistance of the thermo-sensitive film.

Plasma-enhanced metal-organic chemical vapor deposition (MOCVD) using a material gas and gaseous oxygen is favorably applied to formation of the thermo-sensitive film and the anti-diffusion film. The material gas consists of a vapor of a single organometallic compound selected from the organometallic compounds of aluminum, chromium, and iron or a mixed vapor thereof.

Alumina is especially preferable for the material of the base plate and the electrically-insulating film. Other available heat-resistant electrically-insulating materials include silicon carbide (SiC), silicon nitride ($Si_3N_4$), zirconia ($ZrO_2$), silica ($SiO_2$), mullite ($3Al_2O_3 \cdot 2SiO_2$), steatite ($MgO \cdot SiO_2$), forsterite ($2MgO \cdot SiO_2$), sialon ($Si_3N_4 \cdot Al_2O_3$), $MgO \cdot Al_2O_3$ and the like.

The electrode film is a thin film of one metal, or an alloy or compound of two or more metals selected from the group consisting of platinum, gold, tantalum, rhenium, osmium, iridium, rhodium, ruthenium, palladium, and tungsten. The RF sputtering method discussed later in Examples is preferably applied to formation of the thin electrode films. The thin electrode films may be formed by the method of vacuum deposition, EB vapor deposition, facing targets sputtering method, or paste-screen printing.

The plasma CVD method discussed later in Examples is preferably applied to formation of the thermo-sensitive film, the anti-diffusion film, and the electrically-insulating film. These films may be formed by another thin film-forming method, such as thermal CVD, vapor deposition, reaction vapor deposition, RF sputtering, reaction sputtering, or facing targets sputtering method.

In the temperature sensor element according to the present invention, the electrode films are arranged to measure the electrical resistance in the direction of the thickness of the thermo-sensitive film, so that the distance between the electrode films can be regulated in the order of several hundred angstroms. Compared with the arrangement of measuring the electrical resistance in the direction of the area of the thermo-sensitive film, this arrangement can significantly narrow the distance between the electrode films. This arrangement is advantageous for the thermo-sensitive film that is made of a heat sensitive material having relatively large electrical resistance.

The electrical resistance of the oxide having corundum crystalline structure is $10^0$ to $10^5 \Omega \cdot cm$ at a temperature of 800° C. The favorable thickness of the thermo-sensitive film composed of this oxide is 0.5 to 10 $\mu m$.

The present invention is described more in detail according to some preferable examples. The temperature sensor element and the temperature sensor according to the present invention are not restricted to the examples discussed below, but there may be many modifications, changes, and alterations without departing from the scope and spirit of the main characteristics of the present invention. The drawings are prepared for the convenience of illustration and do not accurately represent the size or shape of the respective constituents.

EXAMPLE 1

Figure 1:
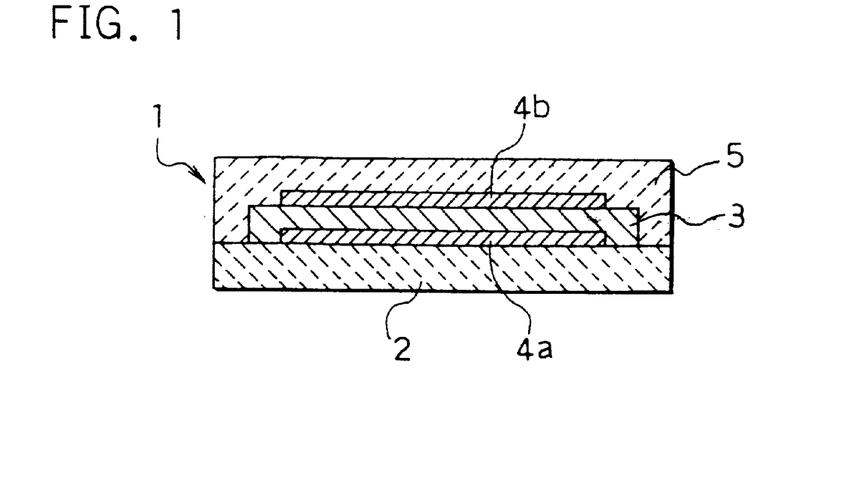
FIG. 1 is a cross sectional view illustrating a temperature sensor element of Example 1 according to the present invention.
Figure 2:
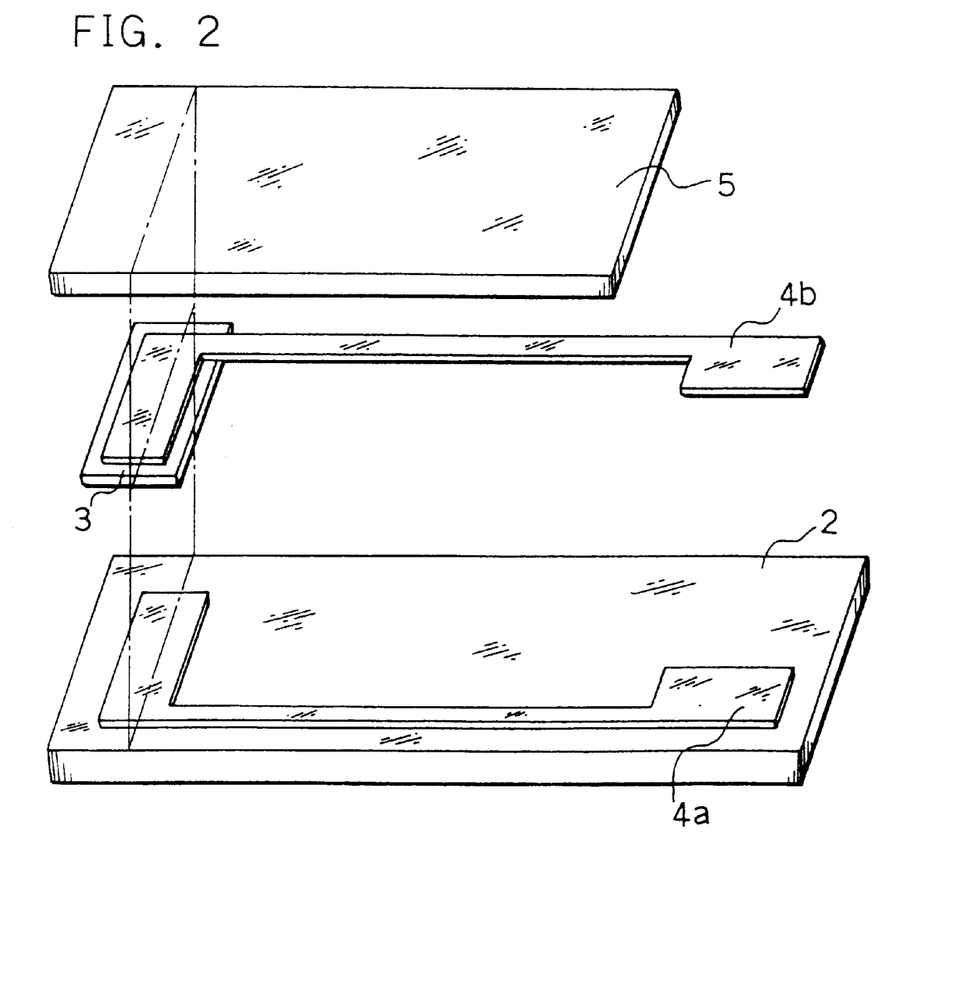
FIG. 2 is a decomposed perspective view illustrating the temperature sensor element of Example 1.

FIG. 1 is a cross sectional view illustrating a temperature sensor element 1 with a thermo-sensitive film of Example 1, and FIG. 2 is a decomposed perspective view of the temperature sensor element 1. FIG. 1 is a cross sectional view taken on the one-dot chain line of FIG. 2. The temperature sensor element 1 includes a thermo-sensitive film 3, a pair of electrode films 4a and 4b having ends arranged to face each other via the thermo-sensitive film 3, a rectangular base plate 2 composed of alumina for supporting these films, and an insulating film composed of alumina for covering the whole thermo-sensitive film 3 and the electrode films 4a and 4b except their lead-connecting terminals. The base plate 2 has a size of 50 mm in length, 5 mm in width, and 0.8 mm in thickness. The thermo-sensitive film 3 has an area of 4.0×3.0 mm$^2$ and a thickness of 2 $\mu$m. The electrode films composed of platinum have a thickness of 5000 angstroms, and the electrically-insulating film 5 has a thickness of 2 $\mu$m.

Figure 3:
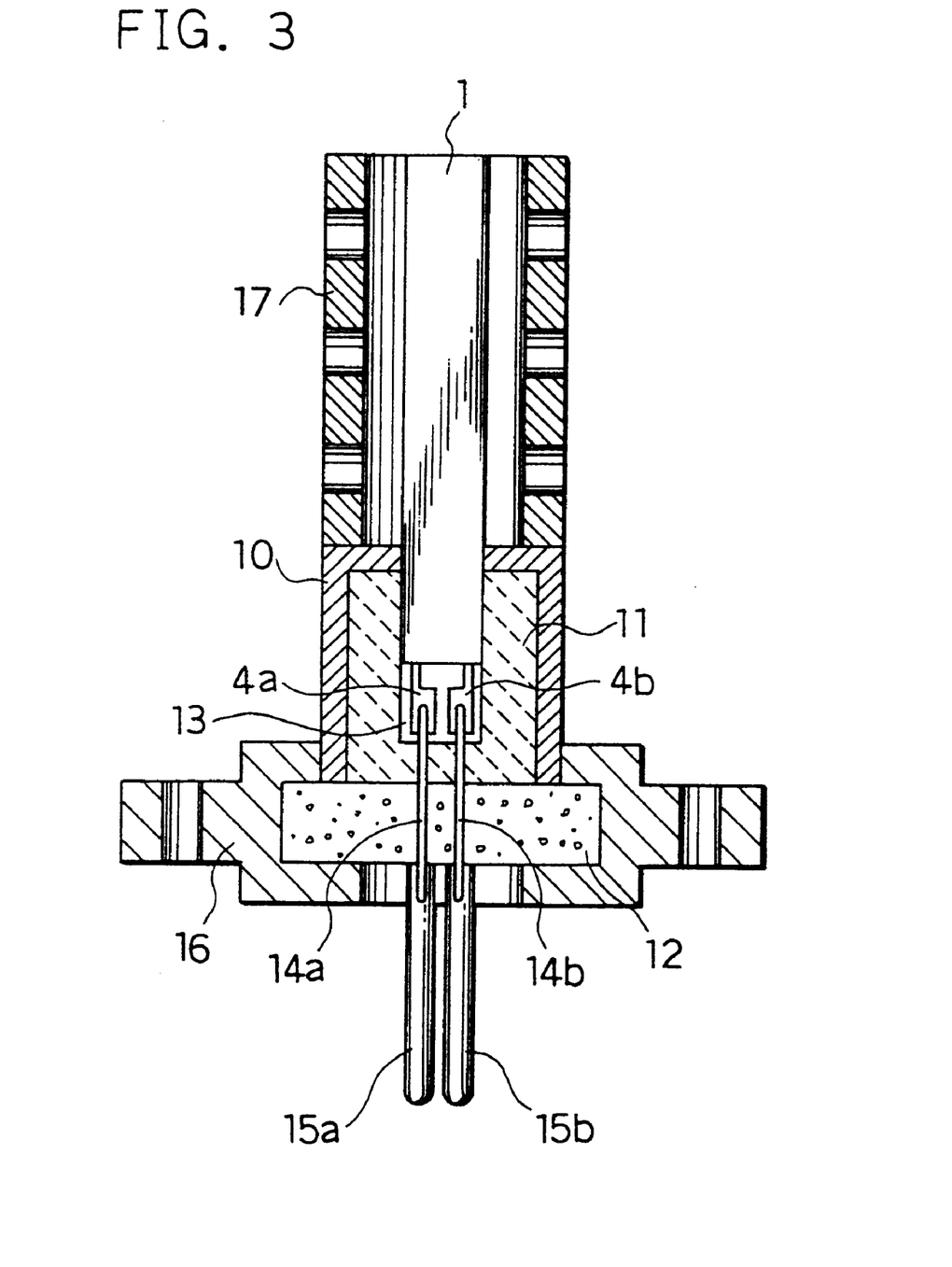
FIG. 3 is a vertical sectional view illustrating a temperature sensor including the temperature sensor element of Example 1.

FIG. 3 shows a temperature sensor including this temperature sensor element 1. One end of the temperature sensor element 1 having exposed portions of the electrode films 4a and 4b is inserted into a metal housing 10 and further fitted into an aperture 13 of an electrical insulator 11 inside the housing 10. The electrode films 4a and 4b are respectively connected with lead wires 14a and 14b. The pair of lead wires 14a and 14b pass through the electrical insulator 11 and another electrical insulator 12 to connect with another pair of lead wires 15a and 15b. The housing 10 is welded to a flange 16 that secures the electrical insulator 12. A perforated cylindrical cover 17 for protecting the element 1 from external shocks is welded to the housing 10. The opening of the housing 10 through which the element 1 is inserted and the opening of the aperture 13 of the electrical insulator 11 have a size that enables the element 1 to be closely fitted therein. This substantially prevents the lead-connecting terminals of the element 1 from being exposed to the atmosphere. The temperature sensor of this example includes the temperature sensor element 1 that has a small heat capacity and is located in the perforated cover 17, so that the heat of the atmosphere is transmitted to the thermo-sensitive film 3 via the electrically-insulating film 5 of 2 $\mu$m in thickness. This arrangement ensures the high response of the temperature sensor.

The following describes a concrete procedure of manufacturing the temperature sensor element 1. In this example, the thermo-sensitive film 3 and the electrically-insulating film 5 were prepared by the plasma CVD method, whereas the electrode films 4a and 4b were prepared by the RF sputtering method.

Figure 4:
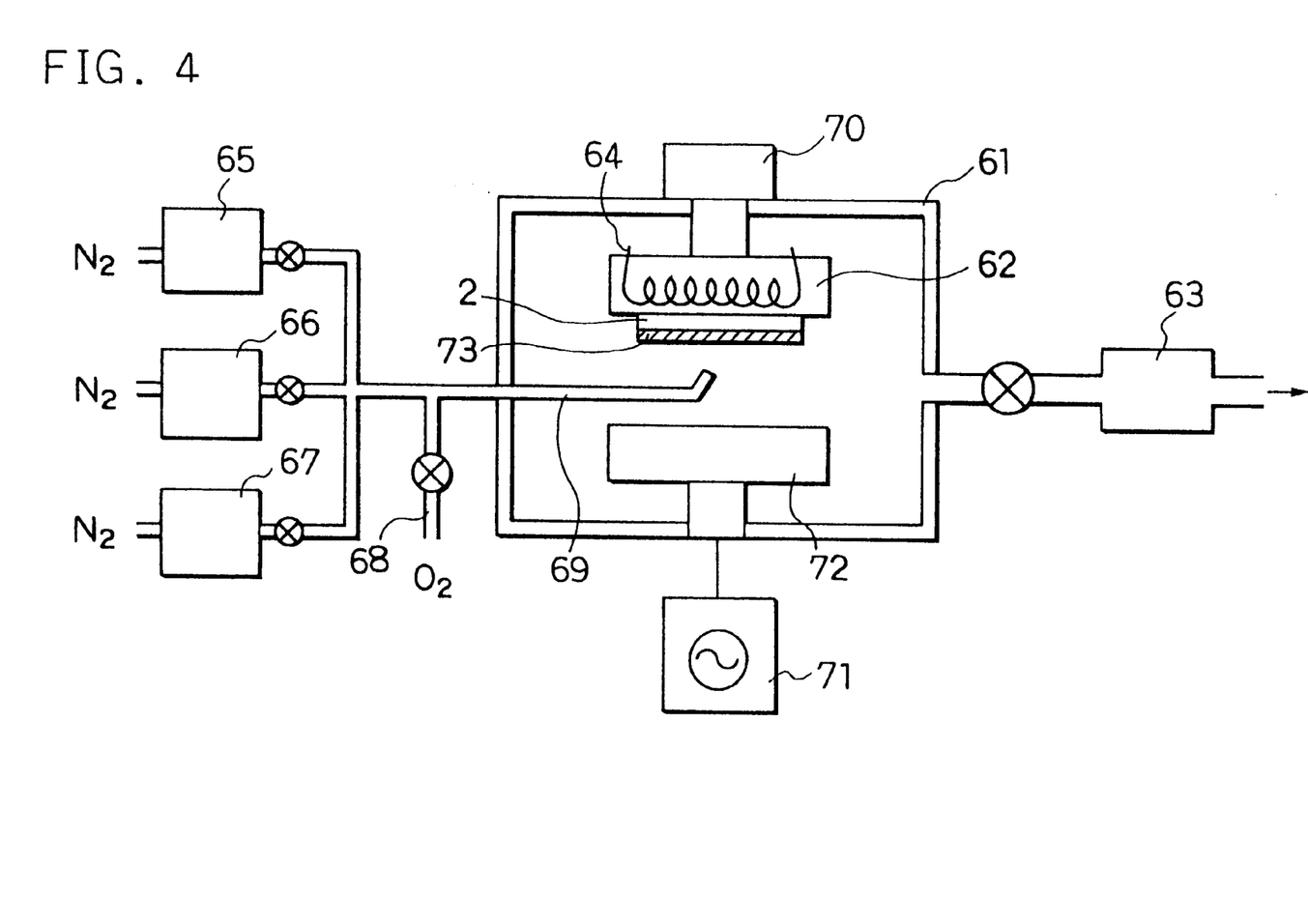
FIG. 4 schematically illustrates structure of a plasma CVD apparatus used in Examples.

FIG. 4 shows a plasma CVD apparatus. The alumina base plate 2 with the electrode film 4a formed thereon as discussed later and a metal mask 73 for partly covering the base plate 2 were set on a base plate holder 62 in a chamber 61. While the chamber 61 was evacuated to 1 Pa with a vacuum pump 63, the base plate 2 was heated to 400° C. with a heater 64. After the temperature of the base plate 2 was stabilized, a vapor of aluminum acetylacetonato from a material gas supply unit 65, a vapor of chromium acetylacetonato from a material gas supply unit 66, and a vapor of iron acetylacetonato from a material gas supply unit 67 were respectively fed with a carrier gas (nitrogen) to the chamber 61. These vapors were mixed with a reaction gas (oxygen) flowing through a supply conduit 68 and introduced onto the alumina base plate 2 via a supply nozzle 69. While the degree of vacuum in the chamber 61 was kept at 10 Pa and the base plate holder 62 was rotated at a speed of 60 revolutions/minute with a base plate rotary motor 70, a high-frequency power source 71 was activated to produce plasma between an electrode 72 and the base plate holder 62 for 20 minutes. This caused the thermo-sensitive film 3 composed of an oxide of aluminum, chromium, and iron having an atomic ratio of Al:Cr:Fe=0.72:0.15:0.13 to be formed on the part of the alumina base plate 2 not covered with the metal mask 73.

For crystallization, the thermo-sensitive film 3 thus obtained was subjected to heat treatment at 1200° C. for three hours in an electric furnace filled with the atmosphere. The heat treatment changed the oxide of aluminum, chromium, and iron to corundum structure.

Figure 5:
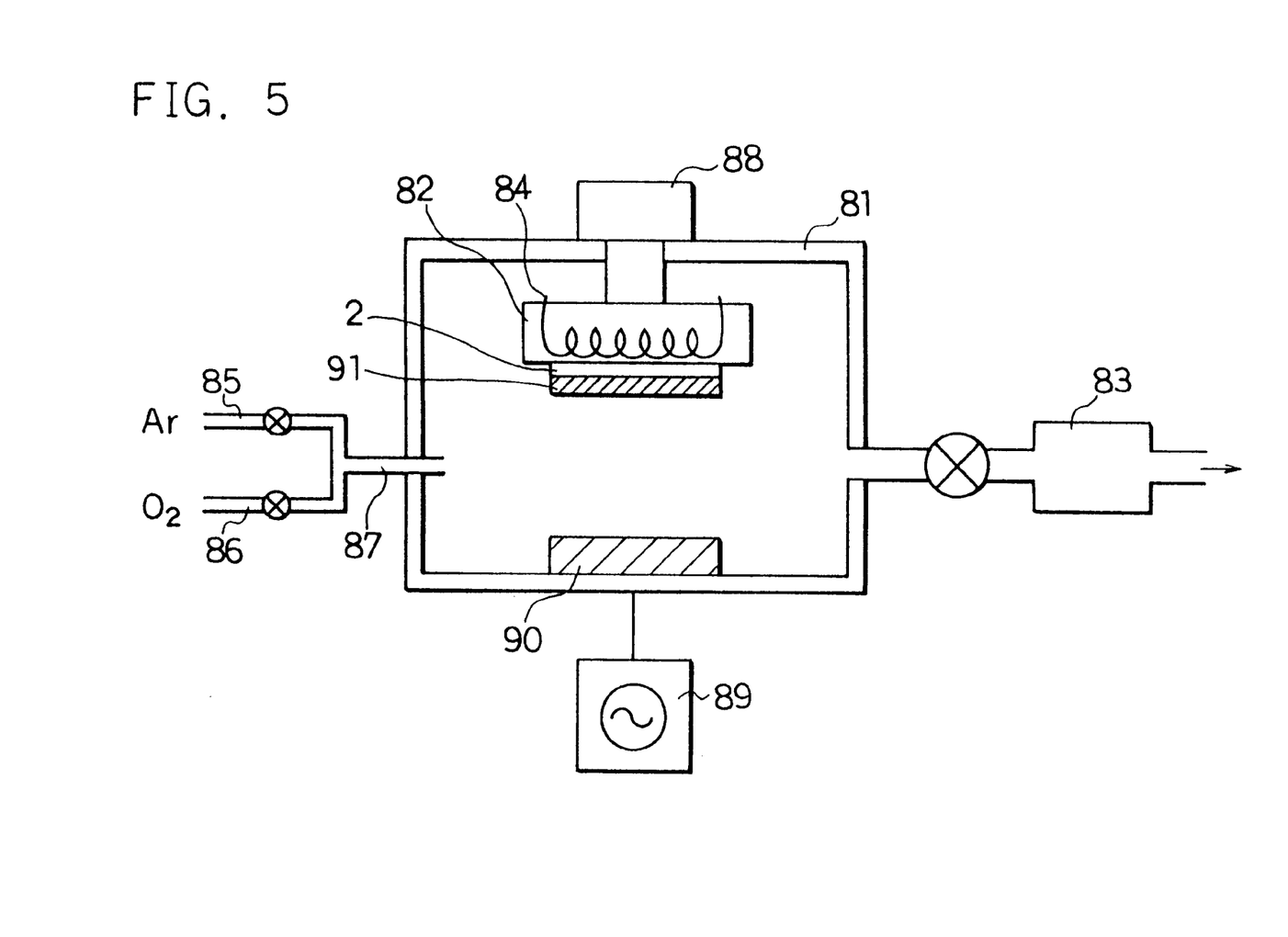
FIG. 5 schematically illustrates structure of an RF sputtering apparatus used in Examples.

The electrode films 4a and 4b were formed with an RF sputtering apparatus shown in FIG. 5. The alumina base plate 2 or the alumina base plate 2 with the electrode film 4a and the thermo-sensitive film 3 formed thereon and a metal mask 91 for partly covering the base plate 2 were set on a base plate holder 82 in a chamber 81. While the chamber 81 was evacuated to 2×10$^{-4}$ Pa with a vacuum pump 83, the base plate 2 was heated to 400 deg.C. with a heater 84. After the temperature of the base plate 2 was stabilized, a sputtering gas (argon) was introduced through a supply conduit 85 into the chamber 81. While the degree of vacuum in the chamber 81 was kept at 1.0 Pa and the base plate holder 82 was rotated at a speed of 5 revolutions/minute with a base plate rotary motor 88, a high-frequency power source 89 was activated to sputter a platinum target 90 for 10 minutes. This cased the platinum electrode film 4a or 4b to be formed on the part of the base plate 2 not covered with the metal mask 91.

The alumina electrically-insulating film 5 was subsequently formed upon a specific part of the thermo-sensitive film 3 and the electrode films 4a and 4b on the alumina base plate 2 with the plasma CVD apparatus shown in FIG. 4. In accordance with a concrete procedure, the alumina base plate 2 with the thermo-sensitive film 3 and the electrode films 4a and 4b formed thereon and the metal mask 73 for partly covering the base plate 2 were set on the base plate holder 62 in the chamber 61. While the chamber 61 was evacuated to 1 Pa, the base plate 2 was heated to 400° C. with the heater 64. A vapor of aluminum acetylacetonato was introduced with the carrier gas of nitrogen from the material gas supply unit 65 onto the base plate 2, whereas oxygen was introduced through the supply conduit 68 onto the base plate 2. While the degree of vacuum in the chamber 61 was kept at 8 Pa and the base plate holder 62 was rotated at a speed of 60 revolutions/minute, the high-frequency power source 71 was activated to produce plasma between the electrode 72 and the base plate holder 62 for 20 minutes. This formed the alumina electrically-insulating film 5.

COMPARATIVE EXAMPLE 1

Powders of $Al_2O_3$, $Cr_2O_3$, and $Fe_2O_3$ were mixed at a predetermined ratio, preliminarily fired, crushed, and molded. The molded body with two platinum pipes inserted therein to form the lead wires 202 was fired at 1600° C. to give the sensor element 200 shown in FIG. 16. The heat sensitive body 201 was a disc-shaped sintered body of corundum crystalline structure having an atomic ratio of Al:Cr:Fe=0.7:0.15:0.15 and a size of 3.7 mm in diameter and 2 mm in thickness. The temperature sensor of the structure shown in FIG. 17 was then prepared with the element 200.

The heat response of the temperature sensor including the temperature sensor element 1 of Example 1 was compared with that of the temperature sensor of Comparative Example 1. The two lead wires of the temperature sensor were connected to a sensor temperature detecting circuit, which had an output terminal connected with a recorder. The temperature sensor kept at room temperature was taken into a high-temperature tank that had previously been kept at temperatures of 350° C., 500° C., and 800° C., and the time period required for causing the measurement value to be increased to 350° C., 500° C., or 800° C. and stabilized was measured. The measurement was carried out five times, and the mean values were used for comparison. The results of measurement are shown in Table 1.

As shown in Table 1, in the temperature sensor of Comparative Example 1, the time periods required for increasing the measurement values from the room temperature to 350° C., 500° C., and 800° C. (that is, the heat response) were 5.0 seconds, 8.3 seconds, and 12.5 seconds, respectively. The heat response of the temperature sensor of Example 1 was, on the other hand, 3.3 seconds, 4.6 seconds, and 6.8 seconds. This shows that the temperature sensor of Example 1 has better heat response than the temperature sensor of Comparative Example 1 in any temperature range.

The measurement of the heat response was carried out after the heat cycle of room temperature to 800° C. was repeated 100 times, in order to examine the variation of the temperature sensor of Example 1 with time. The time periods required for increasing the measurement values from the room temperature to 350° C., 500° C., and 800° C. (that is, the heat response) were all in the range of ±0.5 seconds around the above results of measurement. This proves no substantial variation of the temperature sensor with time.

EXAMPLE 2

Figure 6:
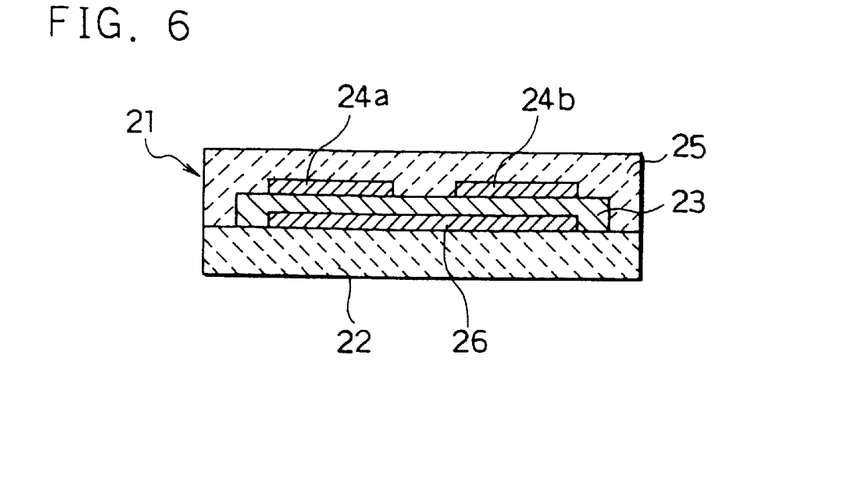
FIG. 6 is a cross sectional view illustrating a temperature sensor element of Example 2.
Figure 7:
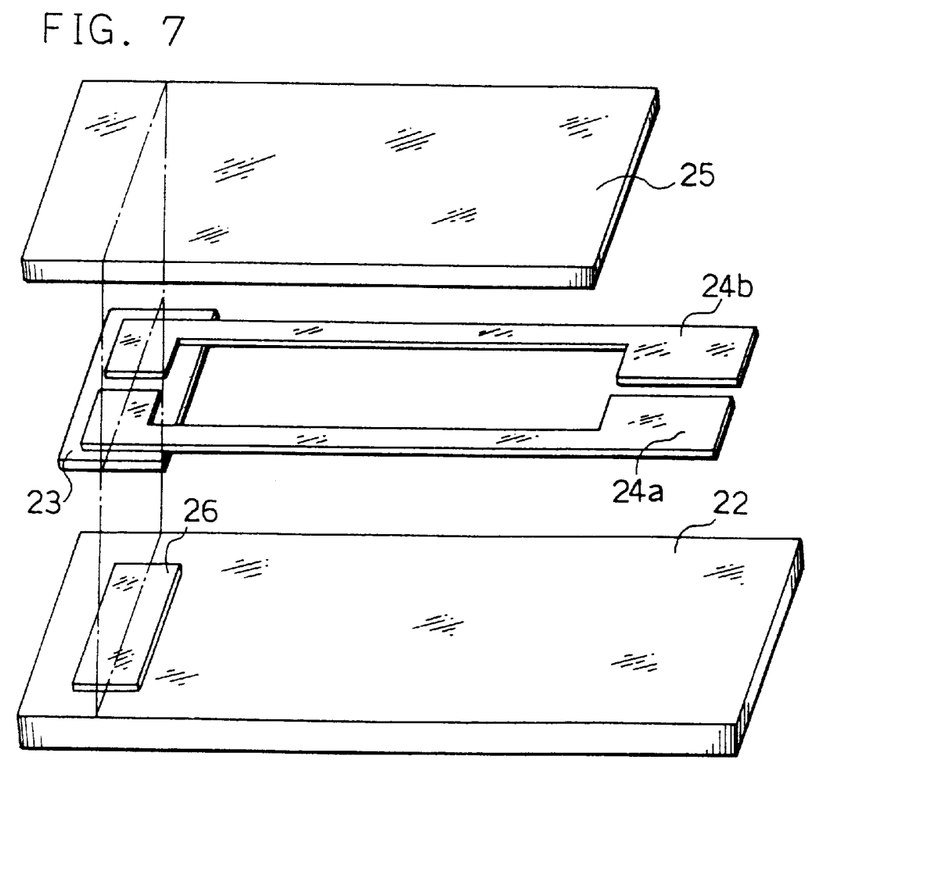
FIG. 7 is a decomposed perspective view illustrating the temperature sensor element of Example 2.

FIGS. 6 and 7 show a temperature sensor element 21 of Example 2. The temperature sensor element 21 includes a third electrode film 26 of platinum arranged on an alumina base plate 22 as well as a thermo-sensitive film 23, a pair of electrode films 24a and 24b, and an alumina electrically-insulating film 25 formed successively upon the third electrode film 26. The third electrode film 26 has an area of 3.5×2.5 mm$^2$ and a thickness of 5000 angstroms. The sizes and the film-forming conditions of the constituents other than the electrode film 26 are identical with those of Example 1. The film-forming conditions of the electrode film 26 are identical with those of the electrode films 24a and 24b. In this structure, the electric current between the pair of electrode films 24a and 24b flows in the sequence of the electrode film 24a, the thermo-sensitive film 23, the electrode film 26, and the electrode film 24b. This structure accordingly enables measurement of the resistance of the thermo-sensitive film 23 between the electrode films 24a and 24b and the third electrode film 26.

A temperature sensor as shown in FIG. 3 was prepared with this temperature sensor element 21, and the heat response of the temperature sensor was measured in the same manner as in Example 1. The results of measurement are shown in Table 1. As clearly shown in Table 1, the temperature sensor of Example 2 has better heat response than the temperature sensor of Comparative Example 1 in any temperature range. The variations in heat response measured after the heat cycle of room temperature to 800° C. was repeated 100 times were all in the range of ±0.5 seconds.

EXAMPLE 3

Figure 8:
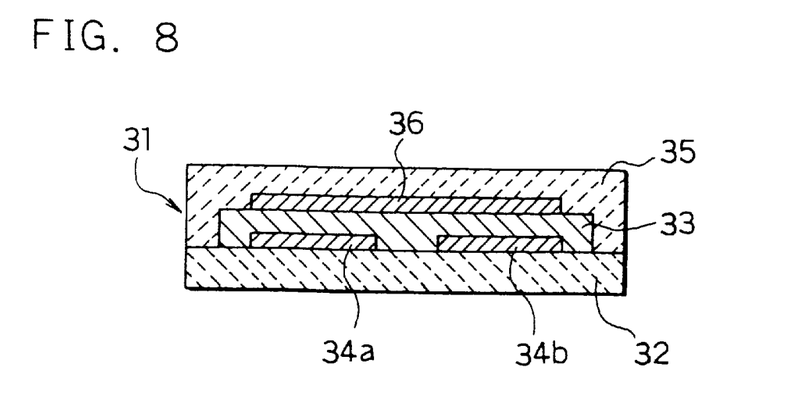
FIG. 8 is a cross sectional view illustrating a temperature sensor element of Example 3.
Figure 9:
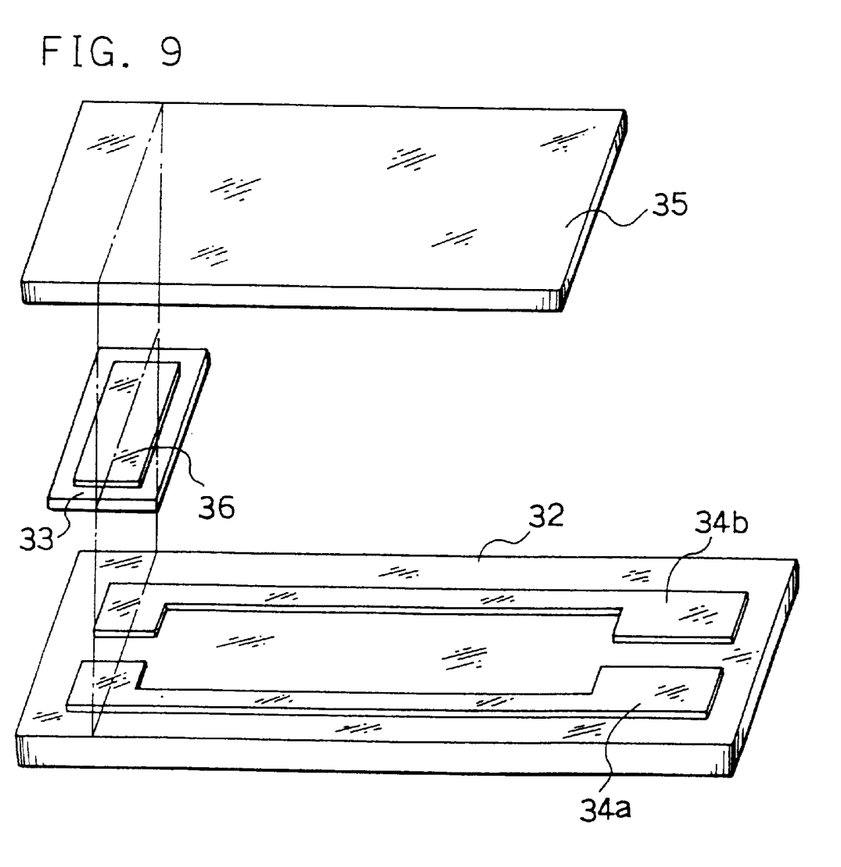
FIG. 9 is a decomposed perspective view illustrating the temperature sensor element of Example 3.

FIGS. 8 and 9 show a temperature sensor element 31 of Example 3. The temperature sensor element 31 includes a pair of electrode films 34a and 34b, a thermo-sensitive film 33, a third electrode film 36, and an alumina electrically-insulating film 35 formed successively on an alumina base plate 32. This structure is similar to that of Example 2, except the exchanged positions of the pair of electrode films 34a and 34b and the third electrode film 36.

A temperature sensor as shown in FIG. 3 was prepared with this temperature sensor element 31, and the heat response of the temperature sensor was measured in the same manner as in Example 1. The results of measurement are shown in Table 1. As clearly shown in Table 1, the temperature sensor of Example 3 has better heat response than the temperature sensor of Comparative Example 1 in any temperature range. The variations in heat response measured after the heat cycle of room temperature to 800° C. was repeated 100 times were all in the range of ±0.5 seconds.

EXAMPLE 4

Figure 10:
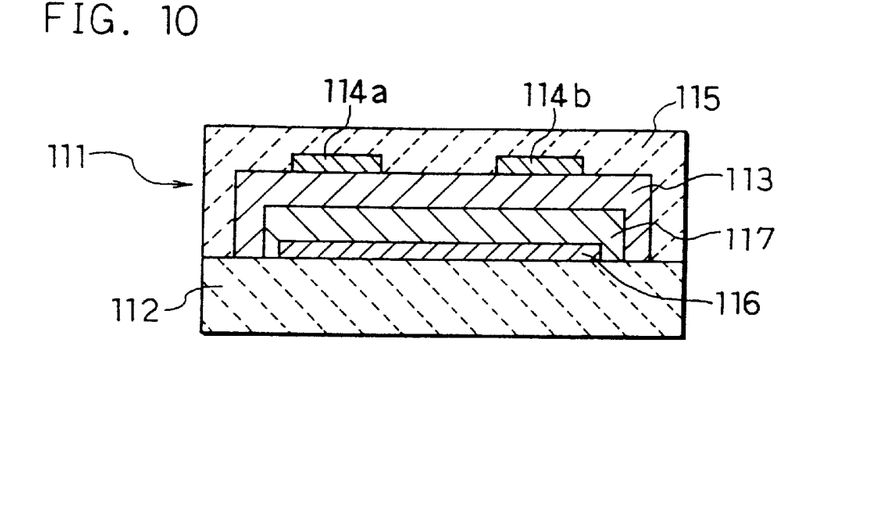
FIG. 10 is a cross sectional view illustrating a temperature sensor element of Example 4.
Figure 11:
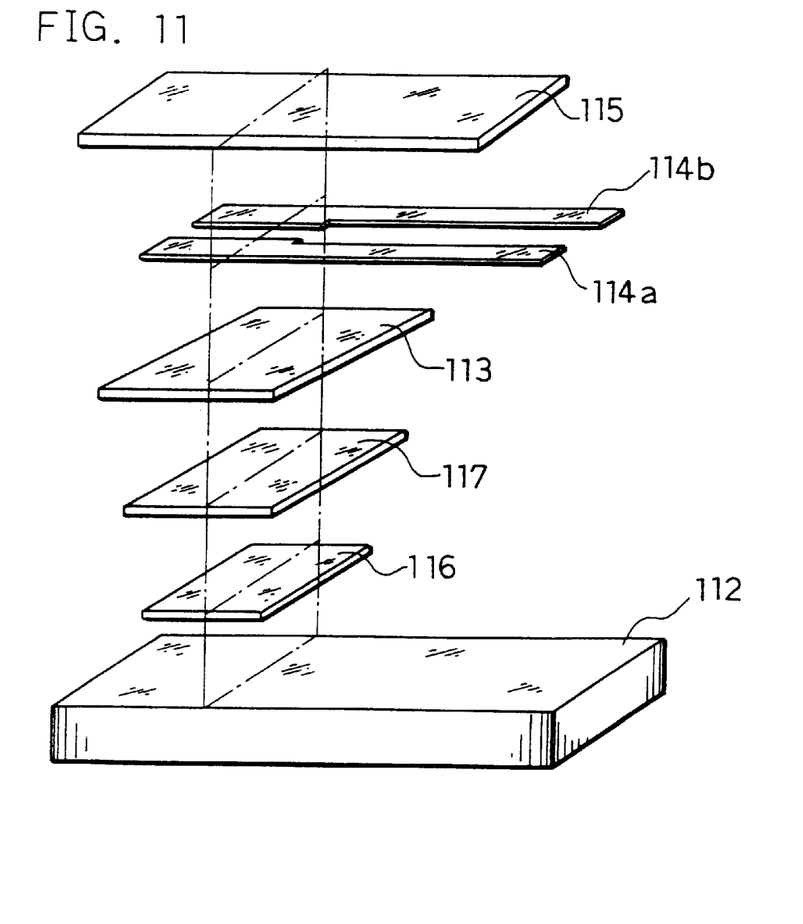
FIG. 11 is a decomposed perspective view illustrating the temperature sensor element of Example 4.

FIGS. 10 and 11 show a temperature sensor element 111 of Example 4. The temperature sensor element 111 includes a rectangular alumina base plate 112, a third electrode film 116 formed on the base plate 112, an anti-diffusion film 117 for covering the whole third electrode film 116, a thermo-sensitive film 113 for covering the whole anti-diffusion film 117, a pair of electrode films 114a and 114b having one end in contact with the thermo-sensitive film 113 and extending in the longitudinal direction of the base plate 112, and an alumina insulating film 115 for covering the whole thermo-sensitive film 113 and the pair of electrode films 114a and 114b except their lead-connecting terminals. The base plate 112 has a size of 50 mm in length, 5 mm in width, and 0.8 mm in thickness. The third electrode film 116 has an area of 3.0×2.0 mm$^2$ and a thickness of 5000 angstroms. The anti-diffusion film 117 has an area of 3.5×2.5 mm$^2$ and a thickness of 2 $\mu$m. The thermo-sensitive film 113 has an area of 4.0×3.0 mm$^2$ and a thickness of 2 $\mu$m. The pair of platinum electrode films 114a and 114b are apart from each other by a distance of 0.5 mm on the thermo-sensitive film 113 and have a thickness of 10 $\mu$m. The electrically-insulating film 115 has a thickness of 2 $\mu$m.

The following describes a concrete procedure of manufacturing the temperature sensor element 111. In this example, the anti-diffusion film 117, the thermo-sensitive film 113, and the electrically-insulating film 115 were prepared by the plasma CVD method. Whereas the third electrode film 116 was prepared by the RF sputtering method, the pair of electrode films 114a and 114b were prepared by the platinum paste-screen printing method.

The third electrode film 116 was formed with the RF sputtering apparatus shown in FIG. 5. The alumina base plate 112 and the metal mask 91 for partly covering the base plate 112 were set on the base plate holder 82 in the chamber 81. While the chamber 81 was evacuated to 2×10$^{-4}$ Pa with the vacuum pump 83, the base plate 112 was heated to 400° C. with the heater 84. After the temperature of the base plate 112 was stabilized, the sputtering gas (argon) was introduced through the supply conduit 85 into the chamber 81. While the degree of vacuum in the chamber 81 was kept at 1.0 Pa and the base plate holder 82 was rotated at a speed of 5 revolutions/minute with the base plate rotary motor 88, the high-frequency power source 89 was activated to sputter the platinum target 90 for 10 minutes. This caused the platinum electrode film 116 to be formed on the part of the base plate 112 not covered with the metal mask 91.

The anti-diffusion film 117 was then formed upon the alumina base plate 112 with the third electrode film 116 formed thereon with the plasma CVD apparatus shown in FIG. 4. The alumina base plate 112 with the electrode film 116 formed thereon and the metal mask 73 for partly covering the base plate 112 were set on the base plate holder 62 in the chamber 61. While the chamber 61 was evacuated to 1 Pa with the vacuum pump 63, the base plate 112 was heated to 400° C. with the heater 64. After the temperature of the base plate 112 was stabilized, a vapor of aluminum acetylacetonato from the material gas supply unit 65, a vapor of chromium acetylacetonato from the material gas supply unit 66, and a vapor of iron acetylacetonato from the material gas supply unit 67 were respectively fed with a carrier gas (nitrogen) to the chamber 61. These vapors were mixed with a reaction gas (oxygen) flowing through the supply conduit 68 and introduced onto the alumina base plate 112 via the supply nozzle 69. While the degree of vacuum in the chamber 61 was kept at 10 Pa and the base plate holder 62 was rotated at a speed of 60 revolutions/minute with the base plate rotary motor 70, the high-frequency power source 71 was activated to produce plasma between the electrode 72 and the base plate holder 62 for 20 minutes. This caused the anti-diffusion film 117 composed of an oxide of aluminum, chromium, and iron having an atomic ratio of Al:Cr:Fe=0.80:0.15:0.05 to be formed on the part of the alumina base plate 112 not covered with the metal mask 73. For crystallization, the anti-diffusion film 117 thus obtained was subjected to heat treatment at 1200° C. for three hours in an electric furnace filled with the atmosphere. The heat treatment changed the oxide of aluminum, chromium, and iron to corundum structure.

On the alumina base plate 112 with the anti-diffusion film 117 and the third electrode film 116 formed thereon, the thermo-sensitive film 113 was subsequently formed, using the plasma CVD apparatus shown in FIG. 4. The film-forming conditions of the thermo-sensitive film 113 are identical with those of the anti-diffusion film 117, except the ratio of the material gases, that is, the vapors of aluminum acetylacetonato, chromium acetylacetonato, and iron acetylacetonato. This yielded the thermo-sensitive film 113 having an atomic ratio of Al:Cr:Fe=0.70:0.20:0.10. For crystallization, the thermo-sensitive film 113 thus obtained was subjected to heat treatment at 1200° C. for three hours in an electric furnace filled with the atmosphere. The heat treatment changed the oxide of aluminum, chromium, and iron to corundum structure.

The pair of electrode films 114a and 114b were then formed by the Pt paste-screen printing method. In accordance with a concrete procedure, a pattern corresponding to the pair of electrode films 114a and 114b was printed on a specific part of the alumina base plate 112 with the third electrode film 116, the anti-diffusion film 117, and the thermo-sensitive film 113 formed thereon according to the screen printing method. After the solvent in the paste was evaporated and dried in a drier at a temperature of 150° C., the alumina base plate 112 was subjected to heat treatment at 1200° C. for 10 minutes in an electric furnace filled with the atmosphere, so that the Pt electrode films 114a and 114b were formed.

The alumina electrically-insulating film 115 was subsequently formed upon a specific part of the third electrode film 116, the anti-diffusion film 117, the thermo-sensitive film 113, and the pair of electrode films 114a and 114b on the alumina base plate 112, using the plasma CVD apparatus shown in FIG. 4. In accordance with a concrete procedure, the alumina base plate 112 with the third electrode film 116, the anti-diffusion film 117, the thermo-sensitive film 113, and the pair of electrode films 114a and 114b formed thereon and the metal mask 73 for partly covering the base plate 112 were set on the base plate holder 62 in the chamber 61. While the chamber 61 was evacuated to 1 Pa, the base plate 112 was heated to 400° C. with the heater 64. A vapor of aluminum acetylacetonato was introduced with the carrier gas of nitrogen from the material gas supply unit 65 onto the base plate 112, whereas oxygen was introduced through the supply conduit 68 onto the base plate 112. While the degree of vacuum in the chamber 61 was kept at 8 Pa and the base plate holder 62 was rotated at a speed of 60 revolutions/minute, the high-frequency power source 71 was activated to produce plasma between the electrode 72 and the base plate holder 62 for 20 minutes. This formed the alumina electrically-insulating film 115.

In this structure, the electric current between the pair of electrode films 114a and 114b flows in the sequence of the electrode film 114a, the thermo-sensitive film 113, the anti-diffusion film 117, the electrode film 116, the anti-diffusion film 117, the thermo-sensitive film 113, and the electrode film 114b. This structure accordingly enables measurement of the resistances of the anti-diffusion film 117 and the thermo-sensitive film 113 between the electrode films 114a and 114b and the third electrode film 116.

The anti-diffusion film 117 formed between the electrode film 116 and the thermo-sensitive film 113 prevents a decrease in resistance of the thermo-sensitive film 113 caused by the diffusion of the material of the electrode film 116 at high temperatures and thus effectively improves the high-temperature stability and the yield of the temperature sensor element 111.

A temperature sensor as shown in FIG. 3 was prepared with this temperature sensor element 111, and the heat response of the temperature sensor was measured in the same manner as in Example 1. The results of measurement are shown in Table 1. As clearly shown in Table 1, the temperature sensor of Example 4 has better heat response than the temperature sensor of Comparative Example 1 in any temperature range. In the same manner as in Example 1, the heat response was measured after the heat cycle of room temperature to 800° C. was repeated 100 times. The variations in heat response, that is, the variations in time periods required for increasing the measurement values from the room temperature to 350° C., 500° C., and 800° C., were all in the range of ±0.5 seconds. This proves no substantial variation of the temperature sensor with time.

EXAMPLE 5

Figure 12:
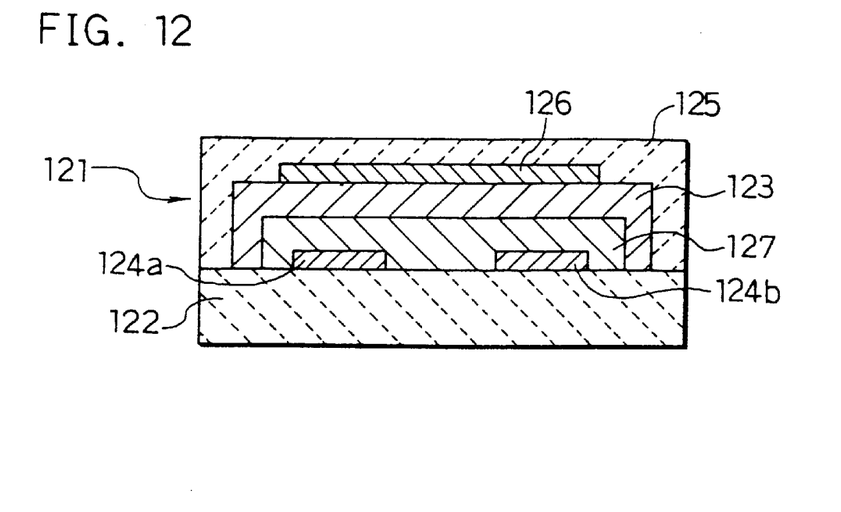
FIG. 12 is a cross sectional view illustrating a temperature sensor element of Example 5.
Figure 13:
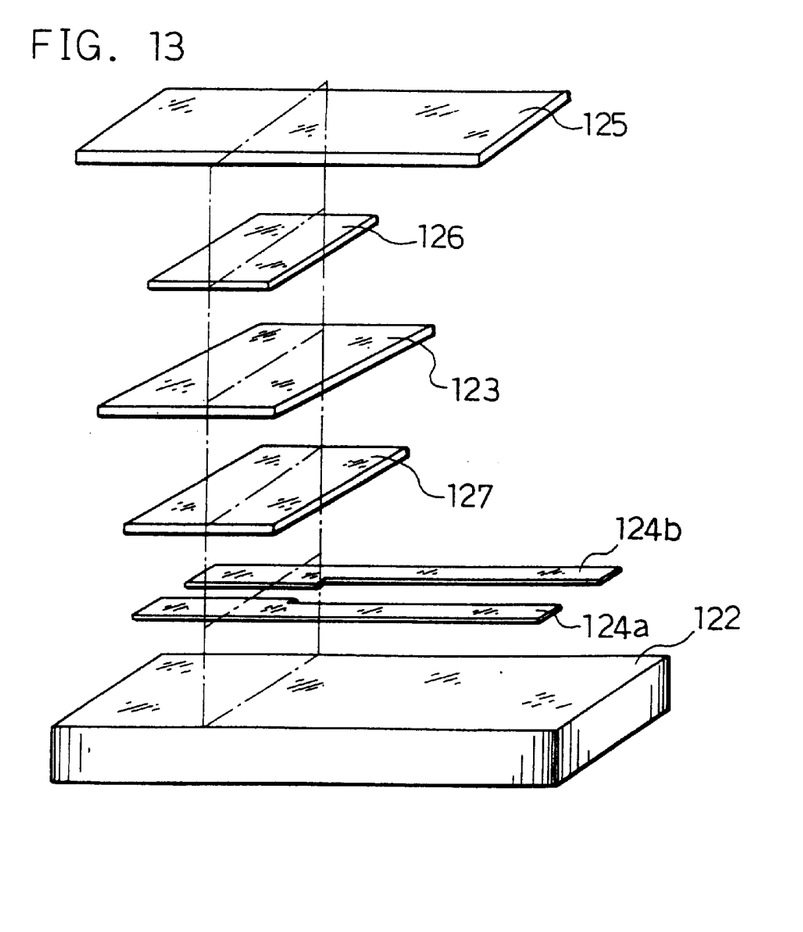
FIG. 13 is a decomposed perspective view illustrating the temperature sensor element of Example 5.

FIGS. 12 and 13 show a temperature sensor element 121 of Example 5. The temperature sensor element 121 includes a pair of electrode films 124a and 124b, an anti-diffusion film 127, a thermo-sensitive film 123, a third electrode film 126, and an alumina electrically-insulating film 125 formed on an alumina base plate 122. The temperature sensor element 121 was manufactured in the same manner as in Example 4, except that the positions of the pair of electrode films 124a and 124b and the third electrode film 126 were exchanged and that all the electrode films were formed by the RF sputtering method to have a thickness of 5000 angstroms. The anti-diffusion film 127 formed between the pair of electrode films 124a and 124b and the thermo-sensitive film 123 prevents a decrease in resistance of the thermo-sensitive film 123 caused by the diffusion of the material of the electrode films 124a and 124b at high temperatures and thus effectively improves the high-temperature stability and the yield of the temperature sensor element 121.

A temperature sensor as shown in FIG. 3 was prepared with this temperature sensor element 121, and the heat response of the temperature sensor was measured in the same manner as in Example 1. The results of measurement are shown in Table 1. As clearly shown in Table 1, the temperature sensor of Example 5 has better heat response than the temperature sensor of Comparative Example 1 in any temperature range. The variations in heat response measured after the heat cycle of room temperature to 800° C. was repeated 100 times were all in the range of ±0.5 seconds.

EXAMPLE 6

Figure 14:
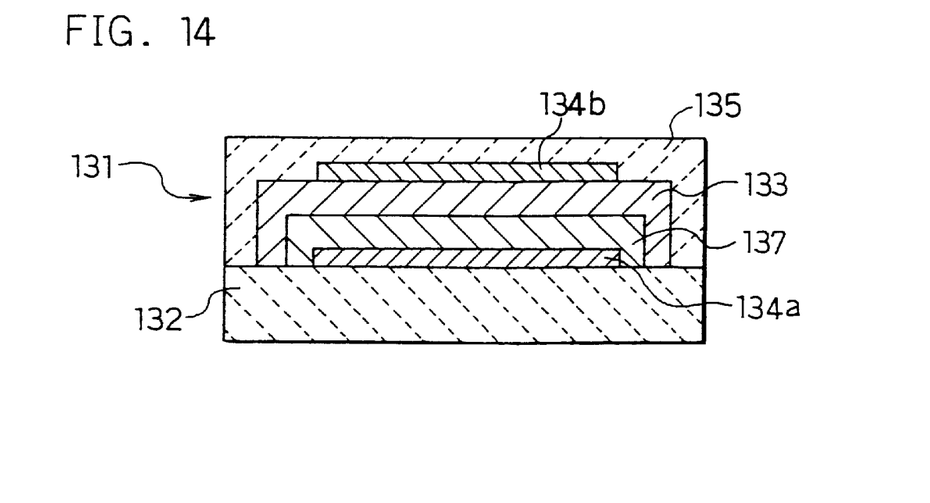
FIG. 14 is a cross sectional view illustrating a temperature sensor element of Example 6.
Figure 15:
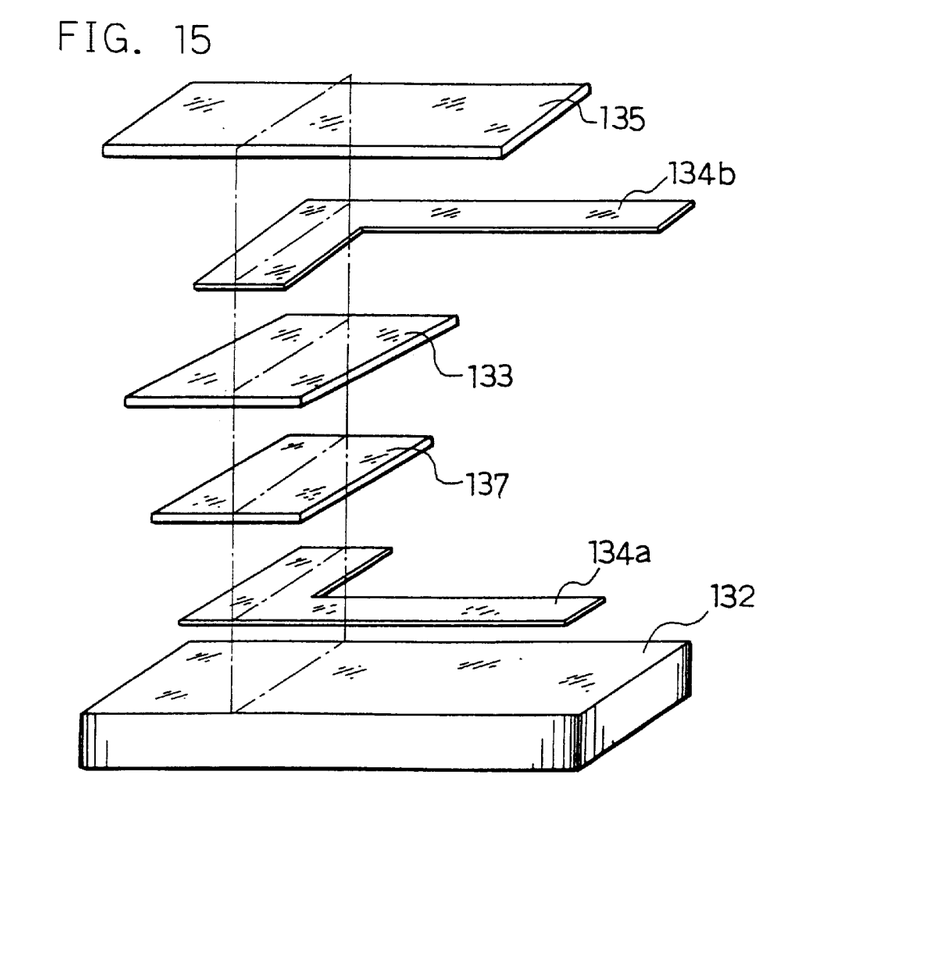
FIG. 15 is a decomposed perspective view illustrating the temperature sensor element of Example 6.

FIGS. 14 and 15 show a temperature sensor element 131 of Example 6. The temperature sensor element 131 includes an electrode film 134a, an anti-diffusion film 137, a thermo-sensitive film 133, an electrode film 134b, and an alumina electrically-insulating film 135 formed on an alumina base plate 132. The temperature sensor element 131 was manufactured in the same manner as in Example 4, except that the anti-diffusion film 137 and the thermo-sensitive film 133 were interposed between the electrode films 134a and 134b and that both the electrode films 134a and 134b were formed by the Pt past-screen printing method to have a thickness of 10 μm. The anti-diffusion film 137 formed between the electrode film 134a and the thermo-sensitive film 133 prevents a decrease in resistance of the thermo-sensitive film 133 caused by the diffusion of the material of the electrode film 134a at high temperatures and thus effectively improves the high-temperature stability and the yield of the temperature sensor element 131.

A temperature sensor as shown in FIG. 3 was prepared with this temperature sensor element 131, and the heat response of the temperature sensor was measured in the same manner as in Example 1. The results of measurement are shown in Table 1. As clearly shown in Table 1, the temperature sensor of Example 6 has better heat response than the temperature sensor of Comparative Example 1 in any temperature range. The variations in heat response measured after the heat cycle of room temperature to 800° C. was repeated 100 times were all in the range of ±0.5 seconds.

TABLE 1

| Sample | Room temperature → 350° C. | Room temperature → 500° C. | Room temperature → 800° C. |
|---|---|---|---|
| Comparative Example 1 | 5.0 seconds | 8.3 seconds | 12.5 seconds |
| Example 1 | 3.3 | 4.6 | 6.8 |
| Example 2 | 3.6 | 4.8 | 7.3 |
| Example 3 | 3.4 | 4.9 | 7.1 |
| Example 4 | 3.2 | 4.5 | 6.9 |
| Example 5 | 3.4 | 4.6 | 7.1 |
| Example 6 | 3.3 | 4.8 | 7.0 |

EXAMPLE 1

In all the above examples, the anti-diffusion film, the thermo-sensitive film, and the electrically-insulating film were formed on the base plate at a temperature of 400° C. The film-forming condition is, however, not restricted to this temperature. The film-forming temperature in the range of 200° C. to 800° C. gives the films of equivalent heat response and durability.

In the above examples, the temperature of heat treatment of the anti-diffusion film and the thermo-sensitive film in the atmosphere for crystallization was 1200° C. The heat treatment condition is, however, not restricted to this temperature. The heat treatment temperature in the range of 1000° C. to 1300° C. gives the anti-diffusion film and the thermo-sensitive film of equivalent crystallinity.

As discussed above, the present invention provides a temperature sensor element that is small in size and has a small heat capacity and thereby excellent heat response. The present invention also provides a temperature sensor having a little heat transmission resistance and improved environment resistance and thereby possessing excellent heat response and high reliability.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed:

1. A temperature sensor element comprising:
   a thermo-sensitive film comprising a heat sensitive material having an electrical resistance which varies depending on the temperature;
   a pair of electrode films, each having a lead-connecting terminal and an end portion opposing said lead-connecting terminal, said end portions of said pair of electrode films arranged on opposite faces of said thermo-sensitive film to provide for measurement of the electrical resistance in a direction transverse to the plane of the thermo-sensitive film
   a base plate comprising a heat-resistant insulating material which supports said thermo-sensitive film and said pair of electrode films;
   a film comprising a heat-resistant insulating material which covers said thermo-sensitive film and said pair of electrode films except for the lead-connecting terminal of each of said pair of electrode films; and
   an anti-diffusion film between said thermo-sensitive film and one of said pair of electrode films which is nearer to said base plate, wherein said anti-diffusion film is formed and heat-treated to form a corundum crystal prior to formation of said thermo-sensitive film such that said anti-diffusion film prevents diffusion of said one of said pair of electrode films into said thermo-sensitive film.

2. A temperature sensor element comprising:
   a thermo-sensitive film comprising a heat sensitive material having an electrical resistance which varies depending on the temperature;
   a pair of electrode films, each having a lead-connecting terminal and an end portion opposing said lead-connecting terminal, said end portions of said pair of electrode films arranged on one face of said thermo-sensitive film;
   a third electrode film arranged on another face of said thermo-sensitive film opposite the end portions of said pair of electrode films to provide for measurement of the electrical resistance in a direction transverse to the plane of the thermo-sensitive film;
   a base plate comprising a heat-resistant insulating material which supports said thermo-sensitive film, said pair of electrode films, and said third electrode film;

a film comprising a heat-resistant insulating material which covers said thermo-sensitive film, said pair of electrode films, and said third electrode film except for the lead-connecting terminal of each of said pair of electrode films;

an anti-diffusion film between said thermo-sensitive film and said pair of electrode films or said third electrode film, whichever is nearer to said base plate, wherein said anti-diffusion film is formed and heat-treated to form a corundum crystal prior to formation of said thermo-sensitive film such that said anti-diffusion film prevents diffusion of said pair of electrode films or said third electrode film, whichever is nearer to said base plate, into said thermo-sensitive film.

3. The temperature sensor element in accordance with claim 1, wherein said thermo-sensitive film is composed of an oxide of corundum crystalline structure represented by the formula $$(Al_{1-x-y}Cr_xFe_y)_2O_3$$

where $0.05 \leq x+y \leq 0.95$, and $0 \leq y/(x+y) \leq 0.6$, and said anti-diffusion film is composed of an oxide of corundum crystalline structure represented by the formula $$(Al_{1-x-y}Cr_xFe_y)_2O_3$$

where $0 \leq x+y \leq 0.95$.

4. The temperature sensor element in accordance with claim 1, wherein each electrode of said pair of films comprises a thin film of one metal or an alloy or compound of two or more metals selected from the group consisting of platinum, gold, tantalum, rhenium, osmium, iridium, rhodium, ruthenium, palladium, and tungsten.

5. A temperature sensor comprising a temperature sensor element in accordance with claim 1, a metal flange which is capable of fixing said temperature sensor to an object of temperature measurement, a metal housing fixed to said metal flange which covers a part of said temperature sensor element wherein the lead-connecting terminal of each of said pair of electrode films is exposed, lead wires connecting with the lead-connecting terminal of each of said pair of electrode films, a cover which covers a part of said temperature sensor element which is outside of said metal housing, and an electrical insulator arranged in said metal housing which insulates the lead-connecting terminal of each of said pair of electrode films from said metal housing and said metal flange.

6. The temperature sensor element in accordance with claim 2, wherein said thermo-sensitive film is composed of an oxide of corundum crystalline structure represented by the formula $$(Al_{1-x-y}Cr_xFe_y)_2O_3$$

where $0.05 \leq x+y \leq 0.95$, and $0 \leq y/(x+y) \leq 0.6$.

7. The temperature sensor element in accordance with claim 2, wherein each electrode of said pair of films comprises a thin film of one metal or an alloy or compound of two or more metals selected from the group consisting of platinum, gold, tantalum, rhenium, osmium, iridium, rhodium, ruthenium, palladium, and tungsten.

8. A temperature sensor comprising a temperature sensor element in accordance with claim 1, a metal flange which is capable of fixing said temperature sensor to an object of temperature measurement, a metal housing fixed to said metal flange which covers a part of said temperature sensor element lead-connecting terminal of each of said pair of electrode films is exposed, lead wires connecting with the lead-connecting terminal of each of said pair of electrode films, a cover which covers a part of said temperature sensor element which is outside of said metal housing, and an electrical insulator arranged in said metal housing which insulates the lead-connecting terminal of each of said pair of electrode films from said metal housing and said metal flange.

* * * * *